(12) United States Patent  
Griswold et al.

(10) Patent No.: US 7,819,478 B2  
(45) Date of Patent: Oct. 26, 2010

(54) ARTICULATING HIGH LATCH FOR A SEAT

(75) Inventors: Les Griswold, Whitmore Lake, MI (US);  
David L. Allen, Manchester, MI (US);  
Kenneth Ptak, Bellville, MI (US);  
Michael Laskowski, Livonia, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/126,560

(22) Filed: May 23, 2008

(65) Prior Publication Data  
US 2009/0021067 A1 Jan. 22, 2009

Related U.S. Application Data

(62) Division of application No. 10/901,016, filed on Jul. 28, 2004, now Pat. No. 7,377,584.

(60) Provisional application No. 60/490,496, filed on Jul. 28, 2003, provisional application No. 60/490,495, filed on Jul. 28, 2003.

(51) Int. Cl.  
*B60N 2/02* (2006.01)

(52) U.S. Cl. .............................. 297/378.13; 297/378.12

(58) Field of Classification Search ............. 297/378.1, 297/378.12, 378.13, 378.14; 296/65.01  
See application file for complete search history.

(56) References Cited

U.S. PATENT DOCUMENTS

| | | | |
|---|---|---|---|
| 425,778 A | 4/1890 | Goetel | |
| 1,812,067 A | 6/1931 | Toncray | |
| 2,235,751 A | 3/1941 | Sears | |
| 2,848,273 A | 8/1958 | Diaz | |
| 2,927,655 A | 3/1960 | Leslie et al. | |
| 2,953,103 A | 9/1960 | Bohannon, et at | |
| 3,262,725 A | 7/1966 | Ballantyne | |
| 3,294,443 A | 12/1966 | Beckman et al. | |
| 3,444,949 A | 5/1969 | Pollock | |
| 3,516,704 A | 6/1970 | Riester | |
| 3,575,462 A * | 4/1971 | Riester ..................... | 296/68.1 |
| 4,067,611 A | 1/1978 | Kurozu et al. | |
| 4,684,175 A | 8/1987 | Trutter | |
| 4,765,682 A | 8/1988 | Satoh | |
| 4,909,571 A | 3/1990 | Vidwans et al. | |
| 4,988,134 A | 1/1991 | Vidwans et al. | |
| 5,248,178 A * | 9/1993 | Brambilla ................ | 296/65.09 |
| 5,498,052 A | 3/1996 | Severini et al. | |
| 5,662,369 A | 9/1997 | Tsuge | |

(Continued)

FOREIGN PATENT DOCUMENTS

EP 02112248 B1 2/1991

*Primary Examiner*—David Dunn  
*Assistant Examiner*—Erika Garrett  
(74) *Attorney, Agent, or Firm*—Foley and Lardner LLP

(57) ABSTRACT

A method and a high latch for a vehicle seat. The vehicle seat has a seatback pivotably coupled to a seat base and the seat base is coupled to a vehicle body having a vehicle wall. The high latch includes a hook carriage including a structural hook, with the hook carriage coupled to the seatback. A striker assembly including a striker arm is configured to selectively engage the structural hook, with the striker assembly coupled to the vehicle body. With the structural hook and striker arm engaged, the seatback will move with the striker assembly from the first position to a second position.

9 Claims, 13 Drawing Sheets

U.S. PATENT DOCUMENTS

| | | |
|---|---|---|
| 5,664,839 A | 9/1997 | Pedronno |
| 5,700,056 A | 12/1997 | Bernard |
| 5,713,634 A | 2/1998 | Koike |
| 5,762,401 A * | 6/1998 | Bernard ................ 297/378.13 |
| 5,957,522 A | 9/1999 | Matsuhashi et al. |
| 6,209,943 B1 | 4/2001 | Neale et al. |
| 6,312,055 B1 * | 11/2001 | Uematsu ................ 297/378.13 |
| 6,341,820 B1 | 1/2002 | Kimura et al. |
| 6,367,859 B1 | 4/2002 | Flory et al. |
| 6,464,299 B1 * | 10/2002 | Castagna ................ 297/378.12 |
| 6,533,341 B2 | 3/2003 | Marinelli |
| 6,547,302 B1 | 4/2003 | Rubio et al. |
| 6,588,822 B1 | 7/2003 | Duvall, Jr. |
| 6,733,078 B1 | 5/2004 | Zelmanov |
| 7,032,973 B2 | 4/2006 | Reubeuze |
| 2005/0023877 A1 | 2/2005 | Vermeulen |

* cited by examiner

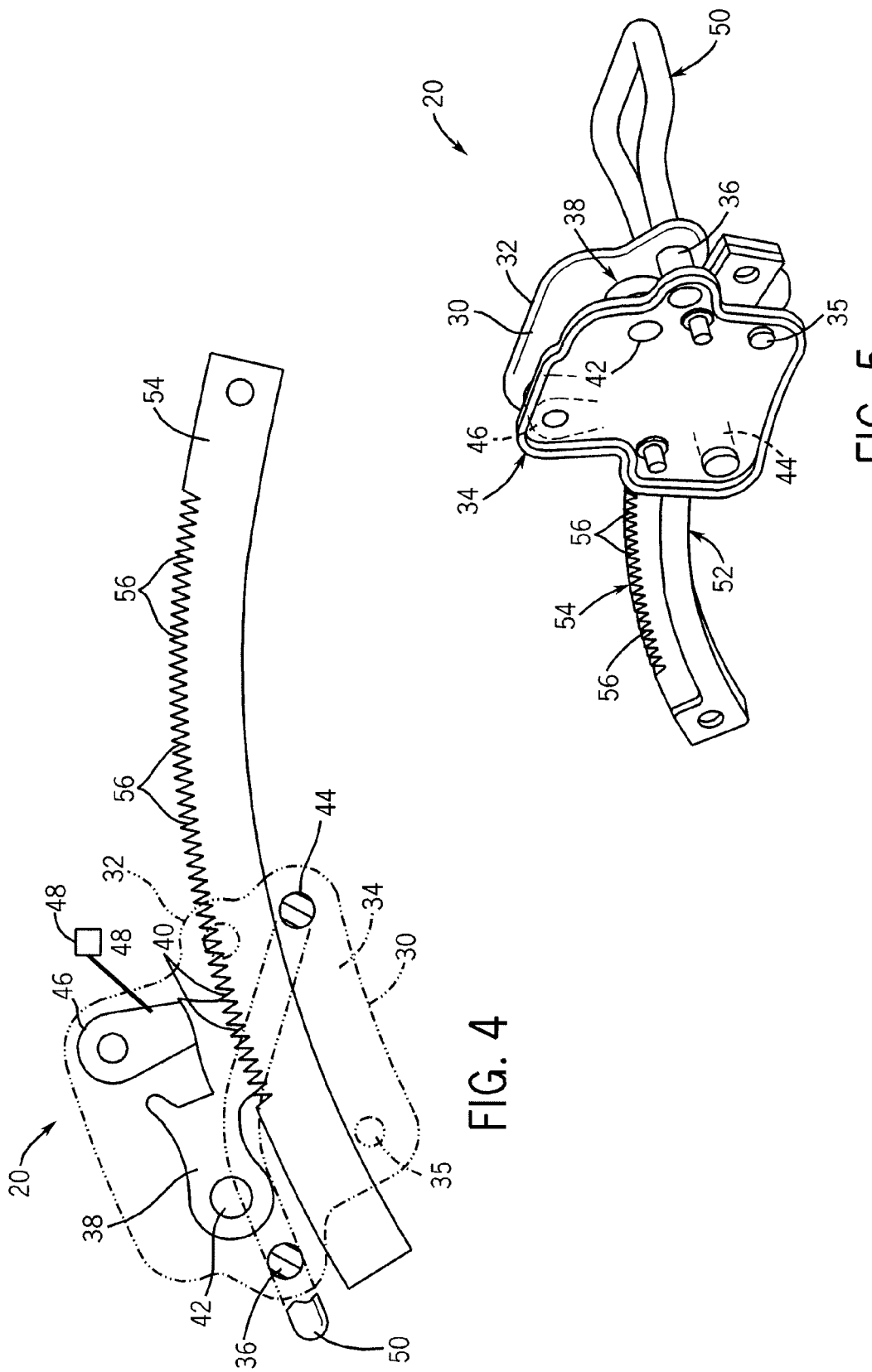

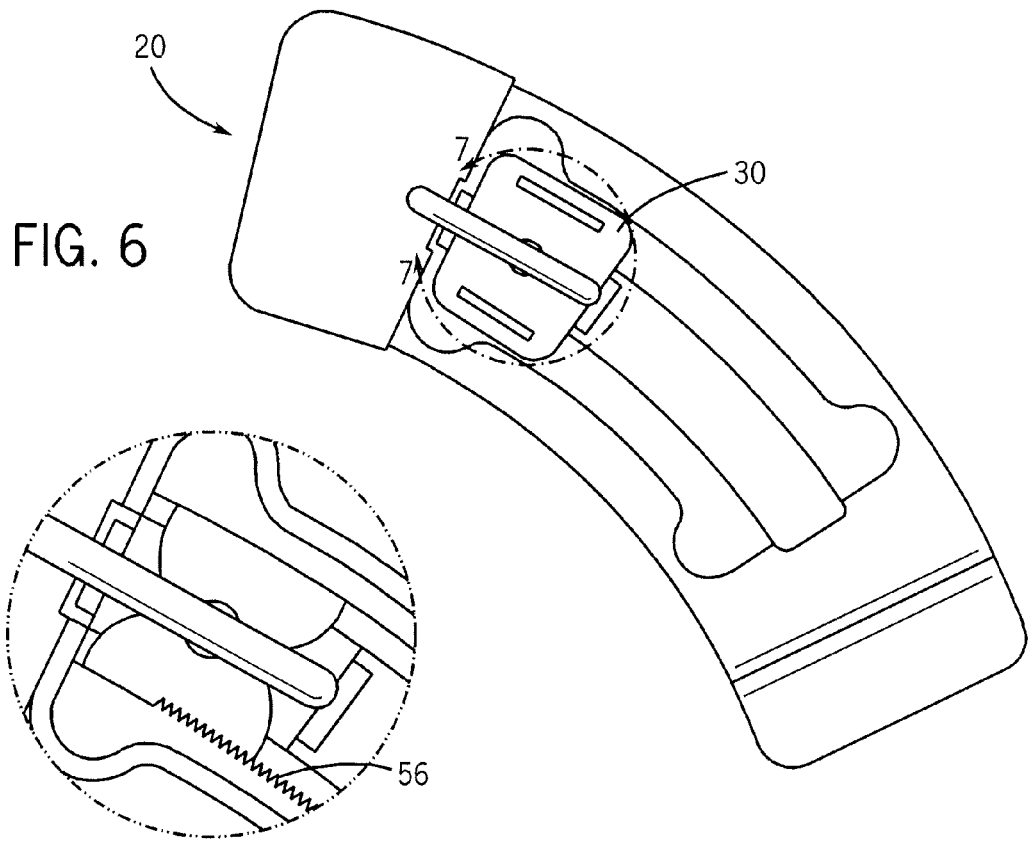
FIG. 6
FIG. 7
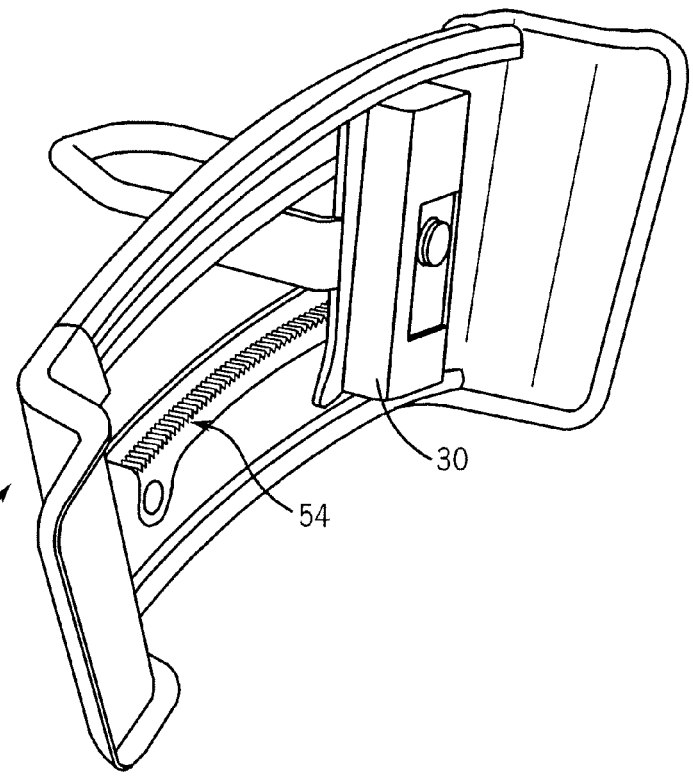
FIG. 8

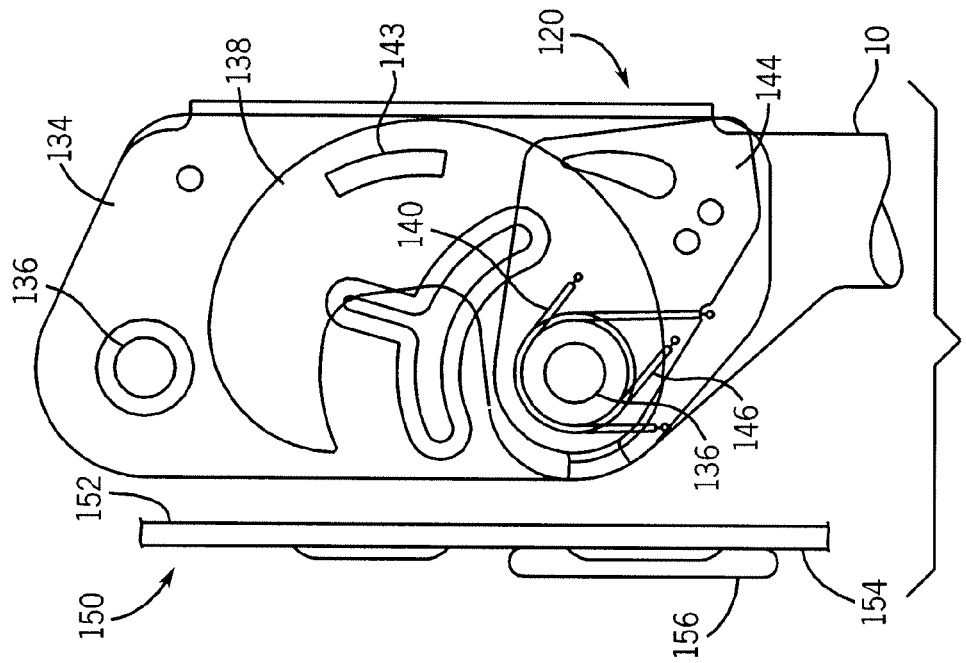
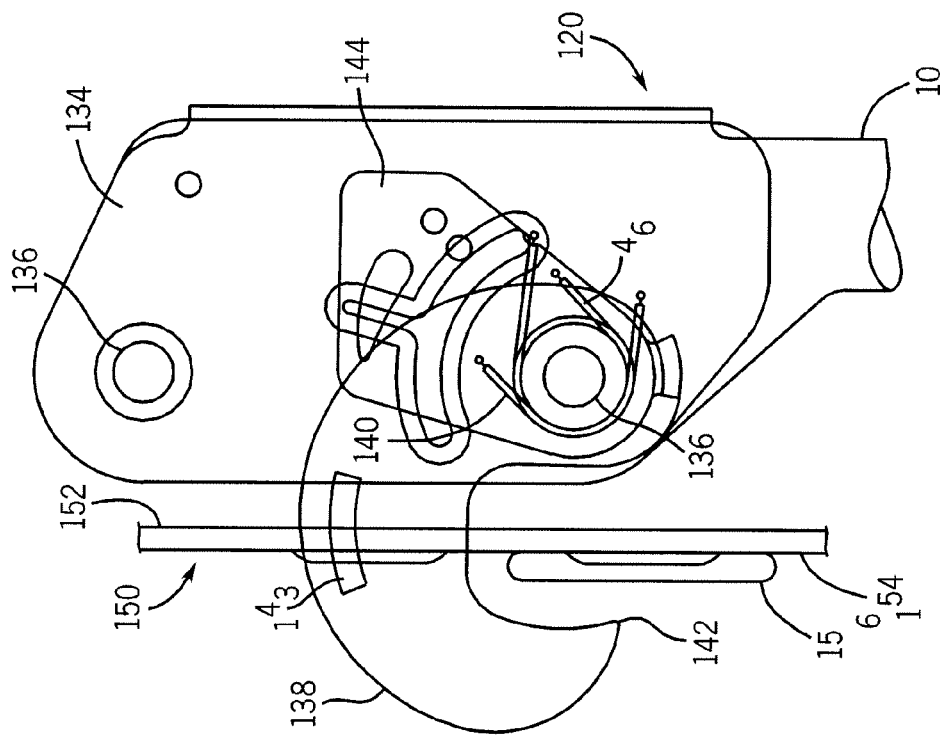

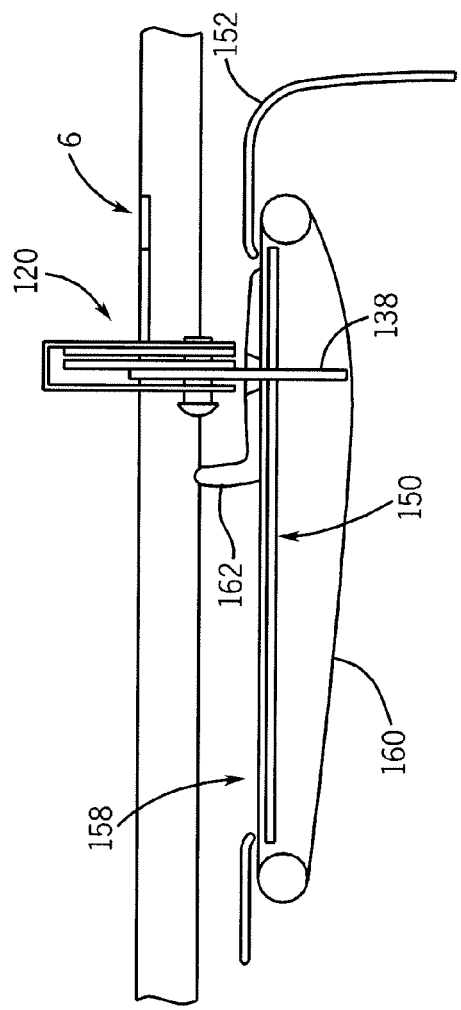
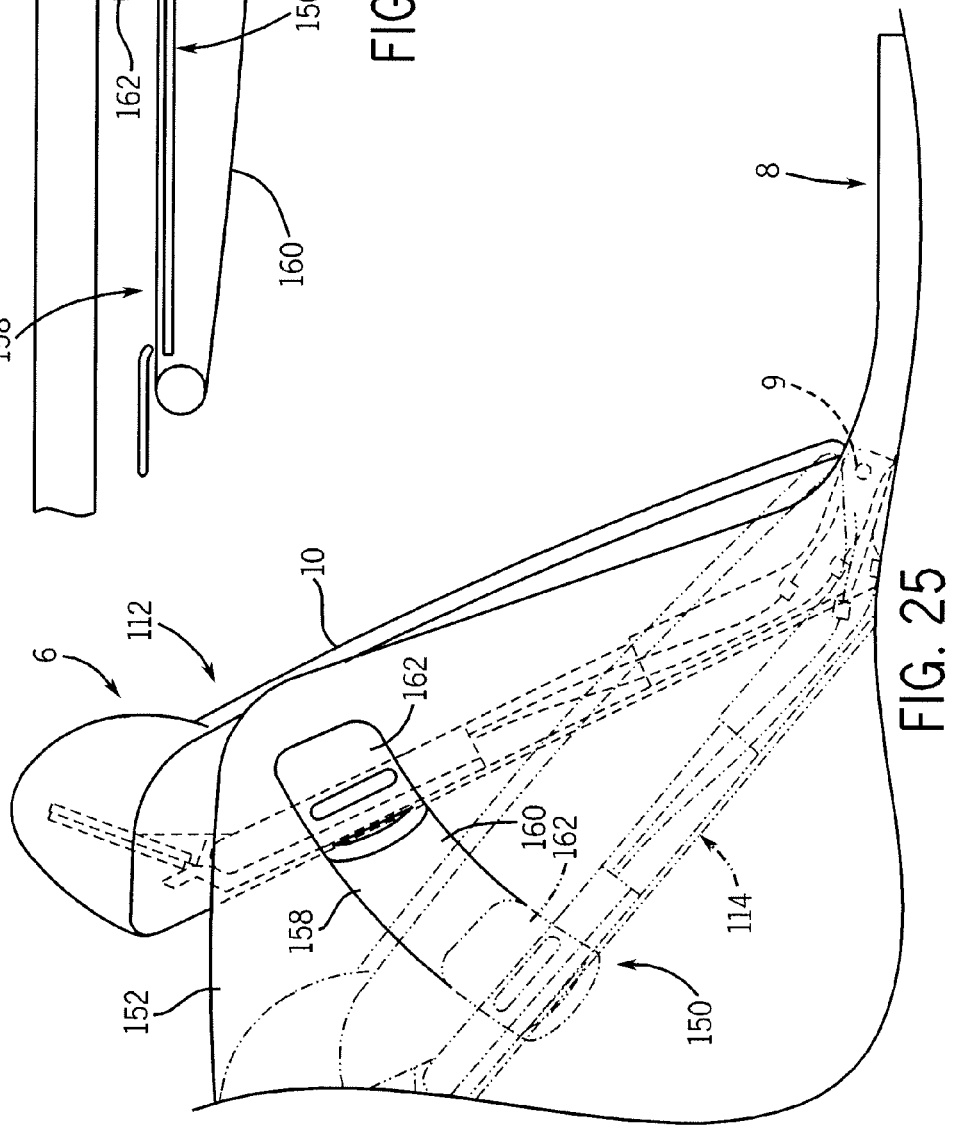
FIG. 26
FIG. 25

US 7,819,478 B2

ARTICULATING HIGH LATCH FOR A SEAT

CROSS-REFERENCE TO RELATED PATENT APPLICATIONS

This application claims the benefit of U.S. Utility patent application Ser. No. 10/901,016, filed Jul. 28, 2004, which claims the benefit of U.S. Provisional Patent Application No. 60/490,495 filed Jul. 28, 2003 and U.S. Provisional Patent Application No. 60/490,496 filed Jul. 28, 2003, all of which are incorporated herein by reference.

BACKGROUND OF THE INVENTION

The present invention relates generally to the field of vehicle seats and more particularly relates to a vehicle seat and an articulating striker for a reclining seat high latch.

It is well known in the art to provide folding seat backs to allow access to cargo storage area through the opening in the partition between the passenger area and the cargo storage area of a vehicle. It is also known to provide a folding seat back to provide access to areas behind a vehicle seat such as for a second and third row seat in any vehicle, for example, a Sports Utility Vehicle (SUV), van, or the like. It is also known to provide a vehicle seat, for example, an automotive seat and a reclinable back.

In a typical configuration, the seat back includes a recliner pivot located between the seat back and seat base. The seatback may also be folded to provide access. The seat back may also include a latch that engages a striker member attached to the vehicle body to secure the seat back in an upright, or designed seating position. With a low recliner pivot position, the seat system is penalized in various ways. For example, such arrangement increases structure in the pivot and reclining mechanism to manage required loads. Such additional structure also increases the weight of the seat assembly. Application of aesthetic trims and materials to the seating structure is difficult and reduces "meat to metal" clearances in the recliner mechanism vicinity of the seat. Such seat configurations require that the latch be released to allow the seatback to pivot to the stowed position.

One prior art disclosure provides a high latch mounted on a seat and having a structural hook that engages a wall rack mounted to the vehicle structure. Reclining motion is facilitated by engaging and disengaging the hook from the wall rack and moving the seat back.

Therefore, there is a need for an articulating striker force reclining seat high latch that provides the reclining function at a position higher on the seat back and would be more efficient in transferring seat loads to the vehicle structure. There is further need for a seat that will provide an improvement in overall craftsmanship, lighter overall weight, and a lower cost to the seating system. There is further need for a seat that will provide for a fold-down position as well as a seating or design position and a reclining capability without disengaging the latch and striker. There is also a need for a method to move the seatback while attached to a striker assembly.

SUMMARY

There is provided a method for articulating a seatback of a vehicle seat. The seatback is coupled to a seat base attached to a vehicle. The method comprises the steps of providing an articulating striker assembly including a striker arm. Coupling the articulating striker assembly to the vehicle. Providing a high latch including a hook. Coupling the high latch to the seatback and coupling the hook to the striker arm. The seatback will move with the articulating striker assembly from a first position to a second position. The first and second positions can be a seating position and a stowed position. For purposes of this disclosure, "high latch" means an apparatus attached to the seatback at a location above the pivot point of the seatback.

Also provided is a high latch for a vehicle seat. The vehicle seat has a seatback pivotably coupled to a seat base and the seat base is coupled to a vehicle body having a vehicle wall. The high latch includes a hook carriage including a structural hook, with the hook carriage coupled to the seatback. A striker assembly including a striker arm is configured to selectively engage the structural hook, with the striker assembly coupled to the vehicle body. With the structural hook and striker arm engaged, the seatback will move with the striker assembly from the first position to a second position. Another embodiment of the high latch, the hook carriage includes a front support bracket and a back support bracket with at least two rivets coupled to the front and back support brackets to maintain the support brackets in a spaced apart relationship. One rivet is coupled to the structural hook. Another embodiment includes a cable operatively coupled to the structural hook and a cable actuator, wherein the cable acts upon the structural hook allowing the seatback to move. Another embodiment of the high latch includes a striker assembly which includes a face plate, a back plate and at least two spacers coupled to the front and back faces to maintain the plates in a spaced apart relationship, with one spacer configured as a guide. A guide apparatus is coupled to the vehicle body an configured to direct the guide spacer.

There is further provided a vehicle seat coupled to a vehicle body having a vehicle wall. The vehicle seat includes a seat base coupled to the vehicle body. A seatback is pivotally coupled to the seat base. A high latch including a hook carriage having a structural hook, with the hook carriage coupled to the seatback and a striker assembly having a striker arm configured to selectively engage the structural hook, with the striker assembly coupled to the vehicle body. With the structural hook and striker arm engaged, the seatback will move with the striker assembly from a first position to a second position.

BRIEF DESCRIPTION OF THE DRAWINGS

FIG. 4 is a side view of the articulating striker illustrated in FIG. 3 and displaying the interior of the striker carriage.

FIG. 5 is another perspective view of the articulating striker illustrated in FIG. 3.

FIG. 6 is a seat-side plan view of another exemplary embodiment of an articulating striker configured as a double pawl.

FIG. 7 is a detailed view of the articulating striker illustrated in FIG. 6 showing the two locking paws and their relation to the upper and lower racks of the assembly.

FIG. 8 is a perspective view of the vehicle body side of the articulating striker illustrated in FIG. 6.

FIG. 21 is an illustration of an exemplary embodiment of a reclining seat high latch assembly in the design (seating) position which illustrates the engagement of a structural hook with a wall rack assembly (also referred to as a striker assembly) mounted behind the vehicle trim.

FIG. 22 is an illustration of the reclining seat high latch assembly illustrated in FIG. 20, in the fold flat/recline position in which the structural hook is disengaged from the wall rack assembly (also referred to as a striker assembly).

FIG. 25 is an illustration of a seat in a seating (design) position and in the recline position and further illustrating the wall rack assembly (also referred to as a striker assembly) mounted in a wall rack opening of the vehicle trim wall.

FIG. 26 is a sectional top view of an exemplary embodiment of the reclining seat high latch assembly engaged with the wall rack assembly mounted behind the vehicle trim wall and further illustrating an exemplary embodiment of a wall rack covering and associated bezel.

DETAILED DESCRIPTION OF EXEMPLARY EMBODIMENTS

Figure 1:
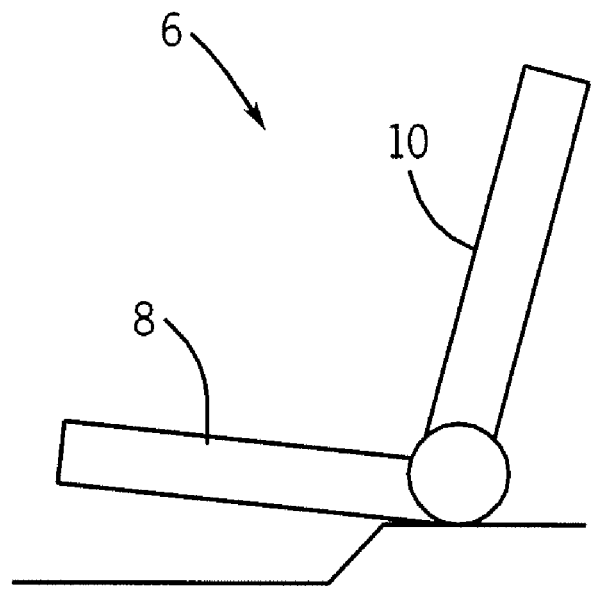
FIG. 1 illustrates a prior art vehicle seat which includes a pivot/recline mechanism located at the pivot point between the seat back and seat base.

Before beginning the detailed description of an exemplary embodiment, several general comments are warranted about the applicability and the scope of the present invention.

First, the illustrations relate to a non-first row seat (also can be referred to as a chair) of motor vehicles, such as cars, SUVs, vans, trucks, buses and the like, but the invention is applicable also to seating used in aircraft, railroad vehicles, nautical vehicles or other environments.

Second, the seat described herein typically is a padded seat having certain contours, trim and the like. While this configuration is presently preferred, a wide variety of seat configurations and appearances will benefit from use of the mechanical support and movement mechanisms. Also the exterior of the seat can be covered by fabric, vinyl, leather or other materials known and used in the seating art. The illustrated seats are shown without padding covering and trims.

Third, with regard to the seat described later herein, substantial modifications can be made without departing from the invention's intended scope. For example, while certain mechanical systems can be used to move seat components to achieve certain results, other mechanisms, manual or powered could be substituted therefore. For example, a screw drive can be used in moving a portion of the seat, other mechanical equivalents including, but not limited to, four bar linkages, air or hydraulic cylinders, air bladders, rack and pinion systems, cams and cables, gears, etc. could be employed. Another example is that for a pelvis support. They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional member being attached to one another. Such joining may be permanent in nature or alternatively may be removable or releasable in nature.

Referring generally to the Figures there is shown a vehicle seat 6 for use in a vehicle 5 of any known type. The vehicle seat 6 includes a seat base 8 which supports a cushioned seat and a seatback 10 pivotally connected to the seat base 8. The seat 6 can be either a manually adjustable seat or may be provided with electric motors to provide automated adjustment and electronic control of the seat. Such manipulation can be accomplished by the use of a change of position mechanism coupled to the seatback 10 and seat base 8. The change of position mechanism provides for the back frame to move in proportional relation to the seat base 8 at a predetermined ratio. The seat 6 is connected to the floor of the support structure of a vehicle 5 in any of a variety of configurations or designs which allow for the movement and adjustment of the seat 6 within the vehicle 5. The vehicle seat 6 may optionally include a headrest which may also be adjustable with respect to an occupant of the seat 6 such as any known or appropriate headrest.

The seatback 10 of the vehicle seat 6 preferably includes a central portion cushion and a pair of side bolsters positioned on the sides of the cushion. The cushion is preferably contoured to receive and support the back of an occupant of the vehicle seat. The side bolsters are also preferably aligned with respect to the cushion and contoured to provide an angled, gradual support of the lateral side portions of an occupant of the vehicle seat 6. The cushion and side bolsters preferably include a foam material and a cover of any appropriate or known material such as cloth, vinyl, leather, etc. The cushion and bolsters typically include support frames.

The seatback 10 further includes a back frame including a cover of any appropriate or known material such as cloth, vinyl, leather, etc. and which preferably matches the cover material of the seat, back cushion, side bolsters and seat base 8. However, it should be understood that a different material may be used on any element. The figures illustrate a frame of a seatback 10 without the covers.

Figure 2:
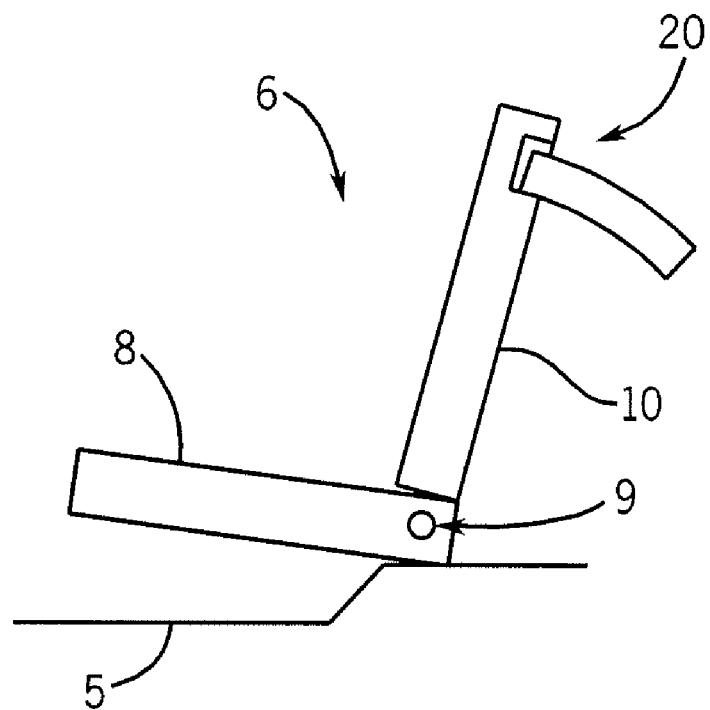
FIG. 2 is an illustration of a seat including a reclining seat high latch assembly.

FIGS. 1 and 2 illustrate the shift of the pivot recline mechanism from the pivot point between the seat back 10 and the seat base 8 of a seat as shown in FIG. 1 to the configuration illustrated in FIG. 2. FIG. 2 illustrates that the pivot between the seat back 10 and the seat base 8 of the seat 6 is a free pivot 9. The free pivot 9 allows the seat back 10 to be positioned to a fully folded down position or to move within a limited degree in a reclining position.

Figure 3:
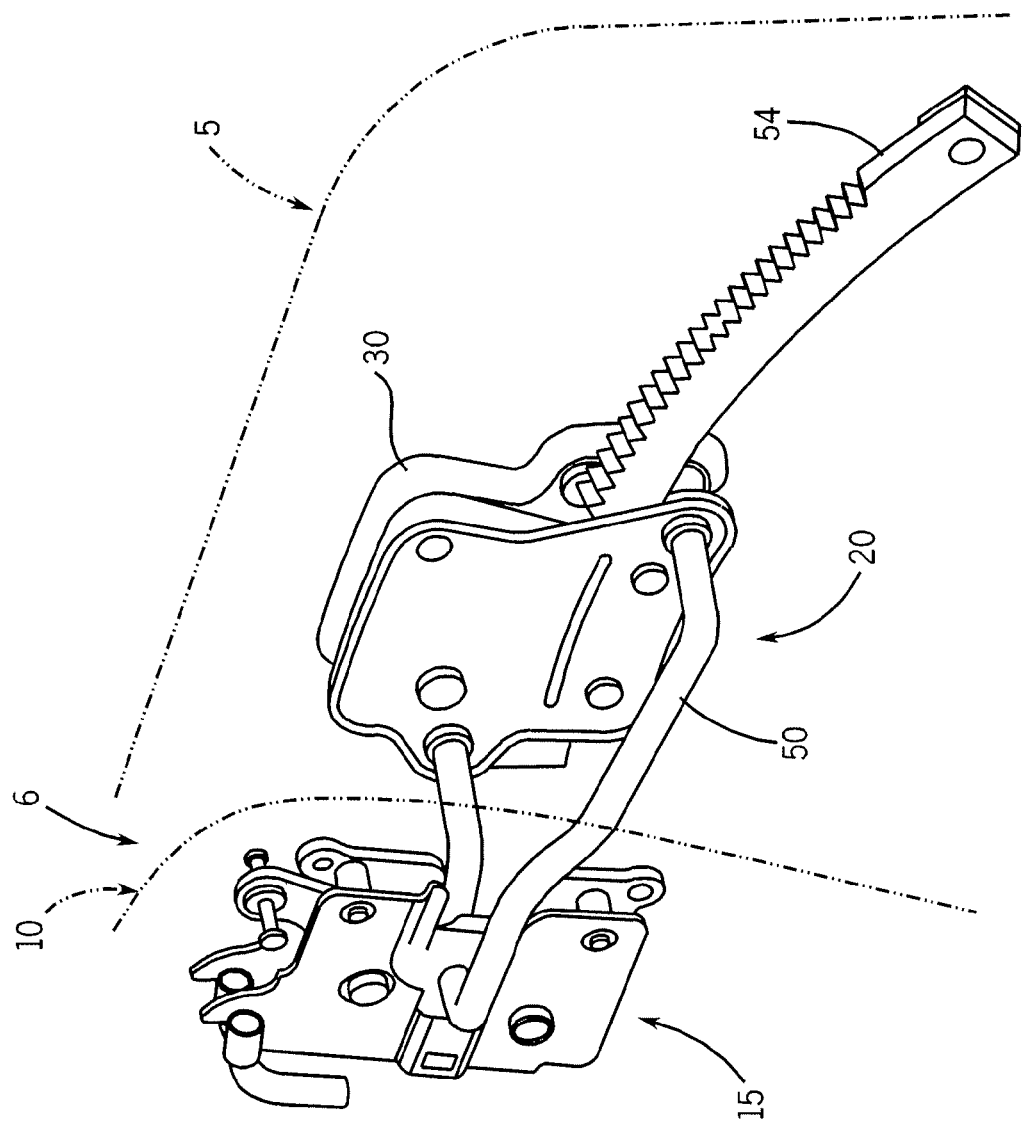
FIG. 3 is a perspective view of an exemplary embodiment of an articulating striker coupled to a latch assembly, with the latch assembly mounted in a seat and the articulating striker mounted to a vehicle structure.
Figure 9:
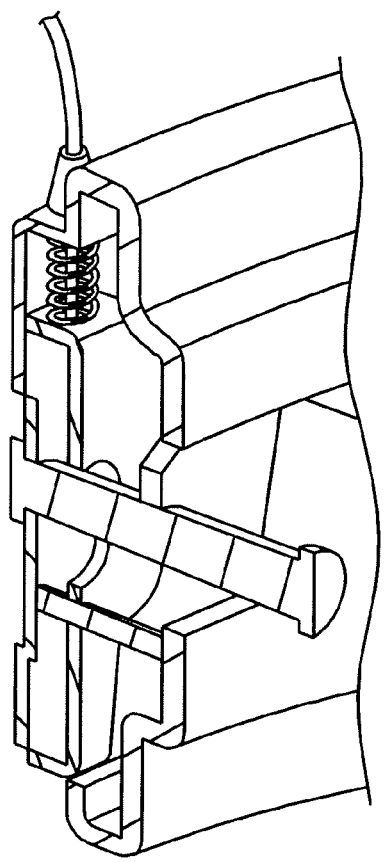
FIGS. 9-12 are perspective partial views of the articulating striker illustrated in FIG. 6 depicting several methods of release and associated elements.
Figure 10:
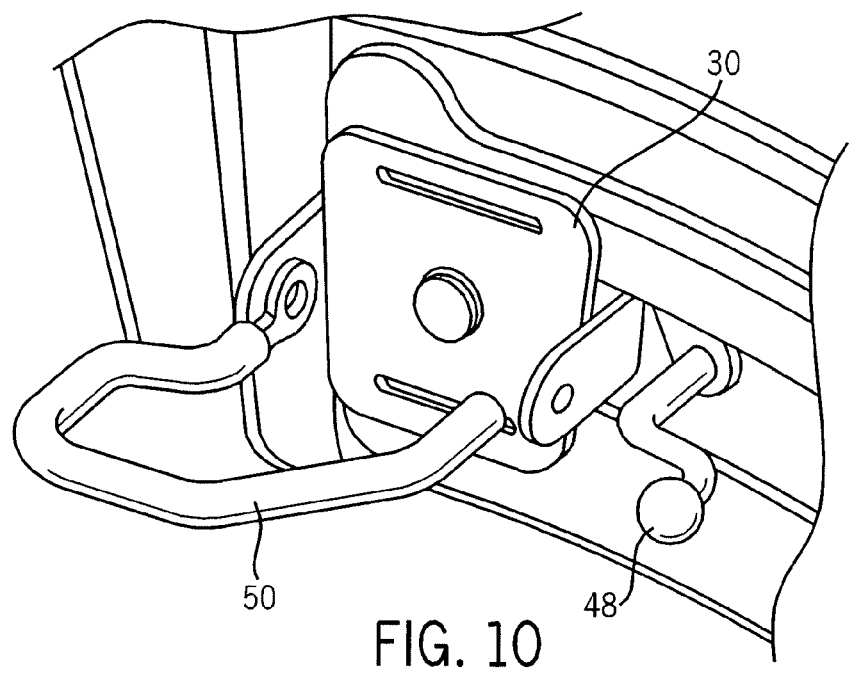
Figure 11:
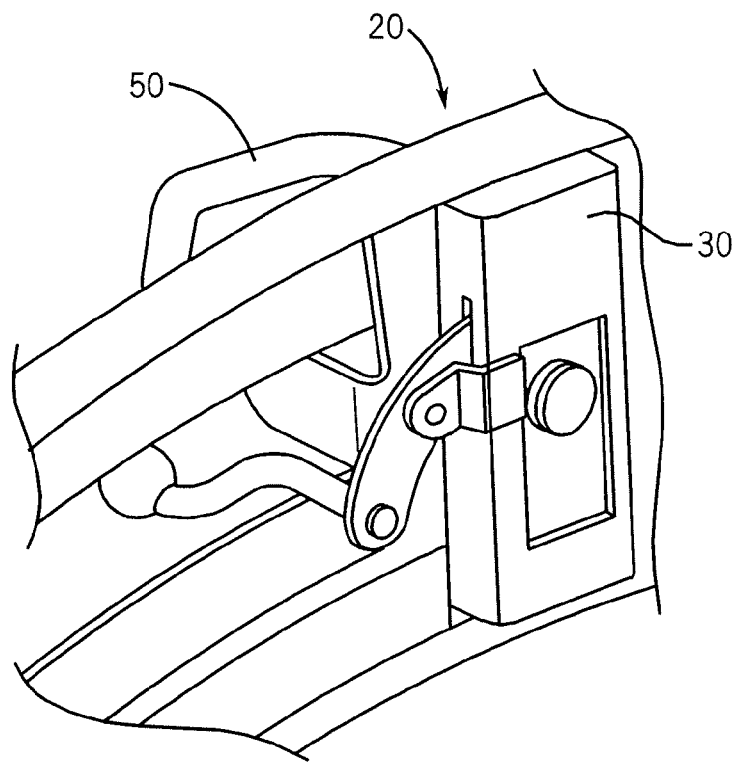
Figure 12:
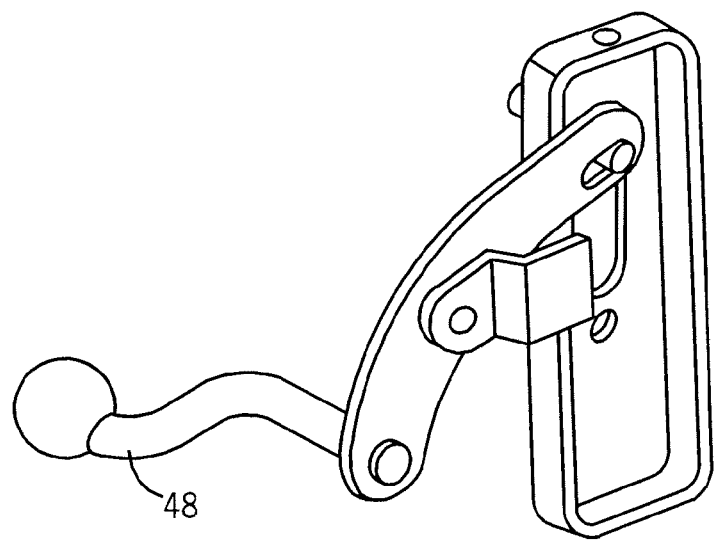

Referring to FIGS. 3-5, there is provided an exemplary embodiment of an articulating striker assembly 20. The articulating striker assembly 20 is mounted to the vehicle structure 5 by any conventional and convenient means, for example, bolts, rivets, welding and typically is concealed by the vehicle auto body trim. The striker arm 50 extends through the vehicle body trim and is engaged by a high latch 15 which includes a hook carriage mounted to the seat back 10 of the seat 6 at a location above the pivot point of the seatback 10.

With the striker arm 50 of the articulating striker assembly 20 coupled to the high latch 15, the seat back 10 can be pushed or pulled by the articulating striker assembly 20 as the striker carriage 30 moves along the rack 54 and guide track 52. It should be understood that the movement of the seat back 10, coupled to the striker assembly 20 can also move (push, pull) the striker carriage 30.

The striker carriage 30 includes a face plate 32 and a back plate 34 which are maintained in a spaced apart relationship by at least a spacer 36 and a guide 44. The striker carriage 30 is assembled with fasteners 35, for example rivets, which couple the face plate 32 and back plate 34 together to form the carriage 30.

Mounted in the striker carriage 30 is a pawl 38. The pawl 38 is pivotably mounted between the face plate 32 and the back plate 34 on a pawl pivot 32. The pawl is provided with pawl teeth 40. A rack 54 having teeth 56 are associated with the striker carriage 30. The pawl teeth 40 are configured to mesh with the teeth 56 of the rack 54 to fix the position of the striker arm 50 to position the seat back 10.

The rack 54 is also coupled to a guide track 52 which is engaged by a guide 44 mounted on the striker carriage 30. The guide 44 moves along the guide track 52 to facilitate the positioning of the striker carriage 30 during operation of the articulating striker assembly 20. The guide track 52 and the rack 54 can be integrally formed as one piece.

A cam 46 is mounted in the striker carriage 30 and positioned to engage the pawl 38. As the cam 46 is rotated, it lifts the pawl 38 thereby disengaging the pawl teeth 40 from the rack teeth 56 to allow the striker carriage 30 to move along the guide track 52. When the position, selected by an operator of the articulating striker assembly 20, reaches a selected position along the guide track 52, the cam 46 is rotated away from the pawl 38 which allows the pawl teeth 40 to re-engage with the rack teeth 56 at the selected position.

It should be understood that an actuator 48 may be coupled to the cam 46, to the pawl 38, and to the striker carriage 30 to facilitate the actuation and movement of the various elements of the articulating striker assembly 20. A separate actuator 48 may be coupled to each such device. Appropriate controls can be coupled to the articulating striker assembly 20 to coordinate movement of the striker carriage 30 while it is coupled to the high latch 15 of the seat back 10 in conjunction with other movements of the seat 6. The actuator 48 can be an electric motor, a lever, cylinder, a cable and a gear train.

An appropriate covering can be provided to minimize the extent of exposure of the articulating striker assembly 20, which covering can be coordinated with the coloring and texture of the vehicle trim.

Another embodiment of an articulating striker assembly 20 is illustrated in FIGS. 6-14. In this embodiment, referred to as a double paw, the striker carriage 30 includes locking paws that are mounted in the striker carriage 30 which moves between an upper bearing rack and a lower rack as particularly illustrated in FIGS. 6-8.

Various methods can be utilized to release the double paw assembly of the striker carriage 30 as illustrated in FIGS. 9-12. An actuator 48 such as a motor, a cable, a cylinder, a gear train, or a lever can be utilized to operate the double paw feature of the striker carriage 30.

Figure 13:
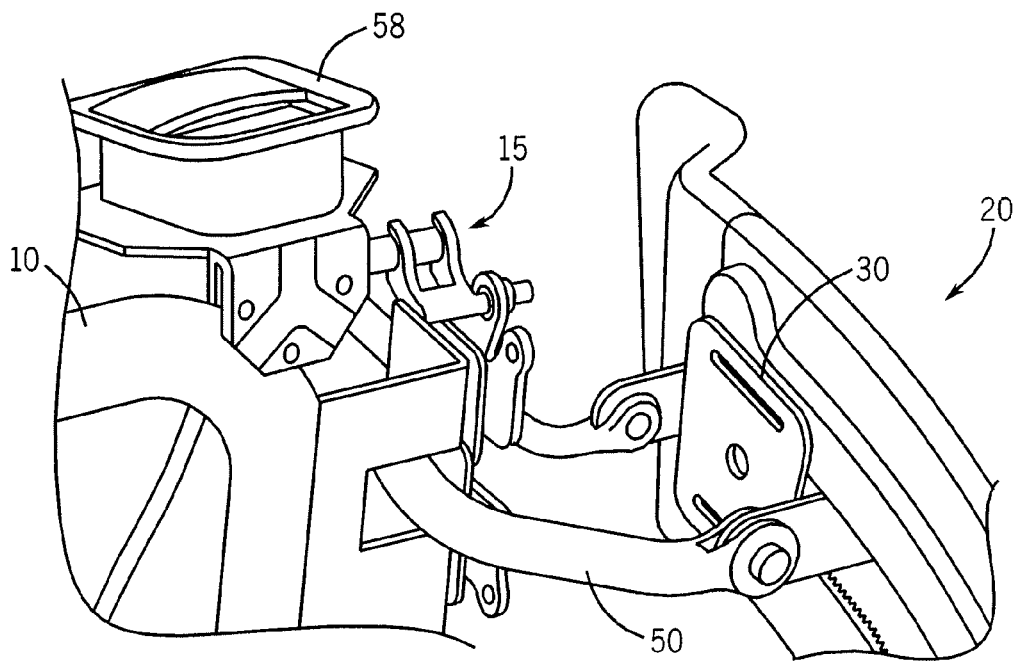
FIGS. 13-14 are partial exterior and interior perspective views of the articulating striker illustrated in FIG. 6 coupled to a latch assembly mounted on a seat frame (without coverings) and the articulating striker mounted to a vehicle structure.
Figure 14:
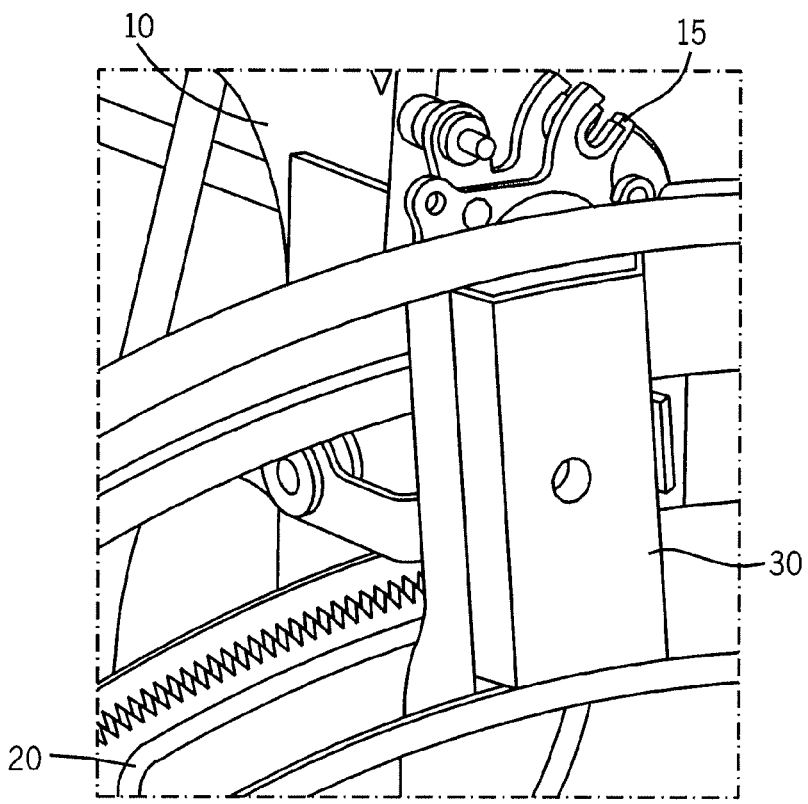

FIG. 13 illustrates the striker arm 50 of the striker carriage 30 of the double paw type articulating striker assembly 20 coupled to a high latch 15. The high latch 15 is mounted to a seat back 10.

Figure 15:
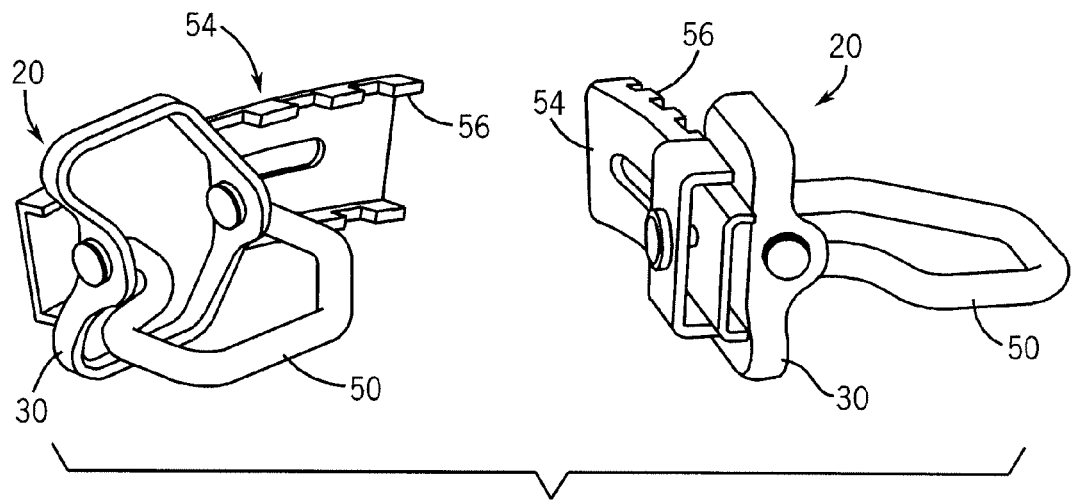
FIG. 15 is two partial perspective views of a pull and slide type articulating striker.

FIG. 15 illustrates another embodiment of an articulating striker assembly 20 of the pull and slide type. The left view illustrates the seat side of the articulating striker assembly 20 and the right view illustrates the vehicle body side of the articulating striker assembly 20. In this embodiment, the striker arm 50 is manually moved which pulls the striker carriage 30 away from the rack 54 thereby disengaging the carriage 30 from the rack teeth 36. A biasing member coupled to the striker carriage 30 can be used to counter the force exerted on the striker arm 50 and carriage 30 during the moving operation.

Figure 16:
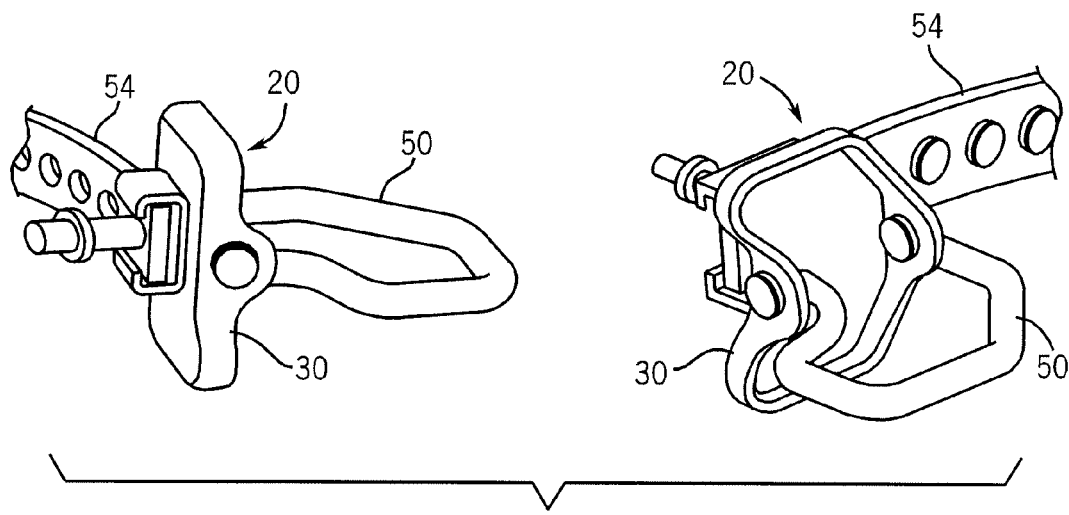
FIG. 16 is two partial perspective views of a pin and socket type articulating striker.

FIG. 16 illustrates an exemplary embodiment of a pin and socket type articulating striker assembly 20. In this embodiment, the rack 54 defines a plurality of orifices that are engaged by a pin mounted to the striker carriage 30. The pin would act as a locking mechanism for the striker carriage 30 as the striker carriage 30 moves along the rack 54.

Figure 17:
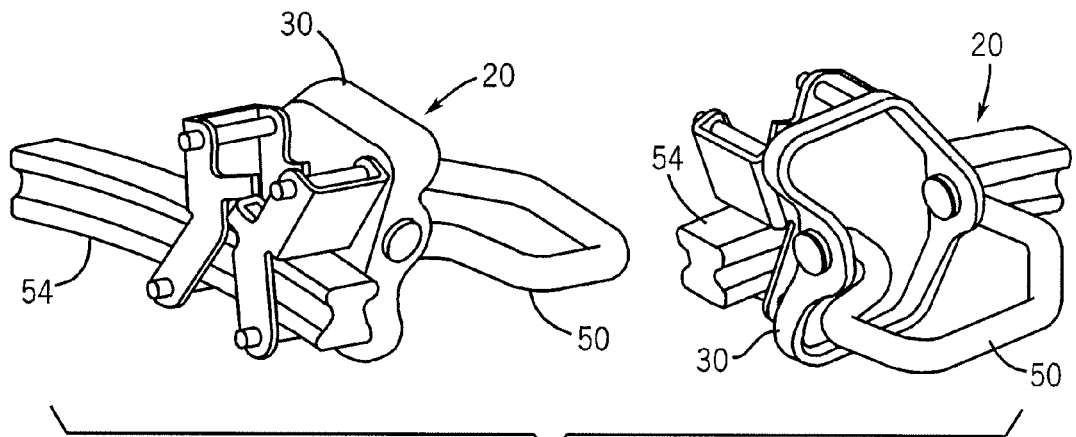
FIG. 17 is two partial perspective views of a slide type articulating striker.

Another embodiment of the articulating striker assembly 20 is illustrated in FIG. 17. A pair of locking levers mounted on the striker carriage 30 lock the striker carriage 30 by a wedging action facilitated by biasing members coupled to the striker carriage 30. The striker carriage moves along the rack 54 and is positioned by engaging and disengaging the wedges mounted on the striker carriage 30.

It should be understood that in any of the above described embodiments of the articulating striker assembly 20, an indicator 58 (an example illustrated in FIG. 13) can be coupled to the articulating striker assembly 20 to indicate proper engagement of the striker arm 50 with the high latch 15. Such indicator can be a light, an audio signal, a tactile device and a visual display. It should also be understood that the articulating striker assembly 20 can be coupled to a seat belt interlock.

The several described elements of the articulating striker assembly 20 can be composed of any suitable material with steel of appropriate composition as the most practical material.

Figure 18:
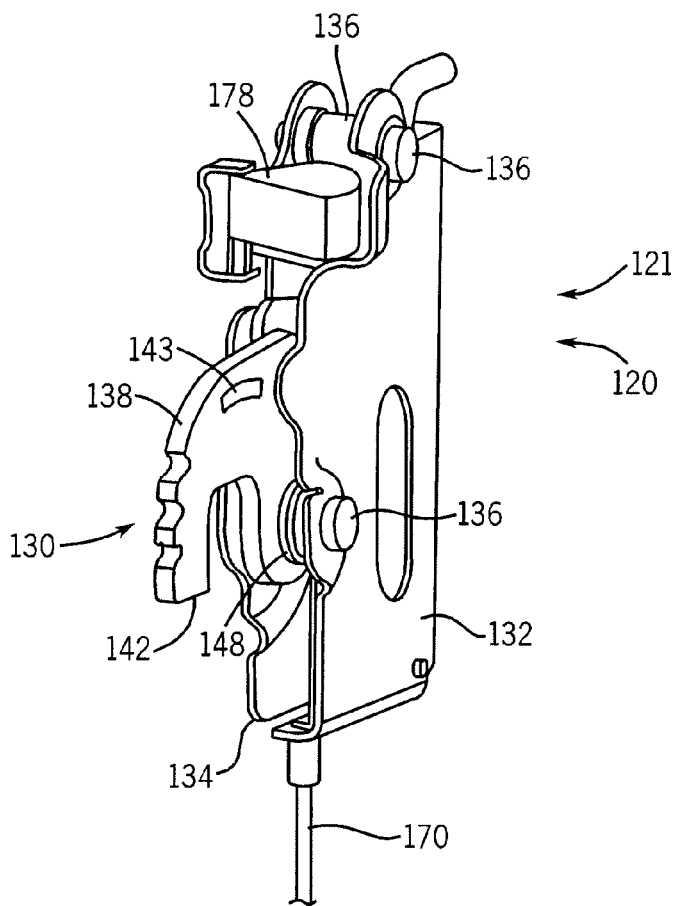
FIG. 18 is a perspective view of an exemplary embodiment of the hook carriage with structural hook of reclining seat high latch assembly.

Referring now to FIG. 18, there is illustrated an exemplary embodiment of a reclining seat high latch assembly 120. The reclining seat high latch assembly 120 also referred to as a hook carriage can include a front support bracket 132 and a back support bracket 134 which are maintained in a spaced apart relationship by hollow rivets 136. Positioned between the front support bracket 132 and the back support bracket 134 is the hook assembly 130 and can include a trip pawl 178, an anti-chuck plate 144 and a seatbelt retractor lock-out lever 184.

Figure 23:
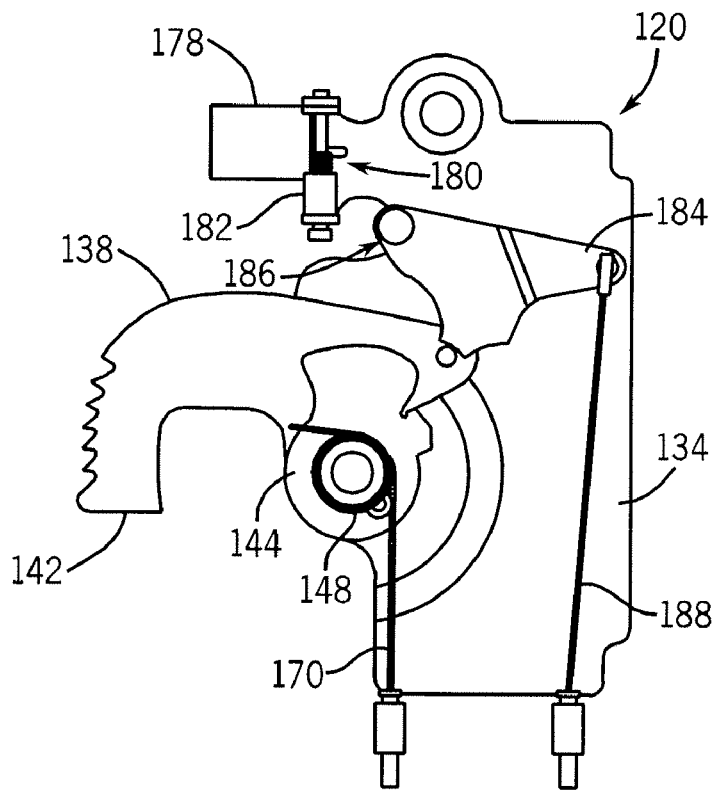
FIG. 23 is a partial side view of an exemplary embodiment of a reclining seat high latch assembly illustrating a seat belt retractor lock-out lever and its associated lock-out cable to the structural hook and its associated anti-chuck plate and cable.

A structural hook 138 is pivotably mounted on one of the hollow rivets 136 and moves from a first position to a second position as illustrated in FIGS. 21 and 22 as will be discussed below. The structural hook 138 can be configured with a point as a leading edge 142 as illustrated in FIGS. 21 and 22 or blunt end as a leading edge 142 as illustrated in FIG. 23. The hook 138 may also be provided with teeth as illustrated in FIGS. 18 and 23.

Figure 19:
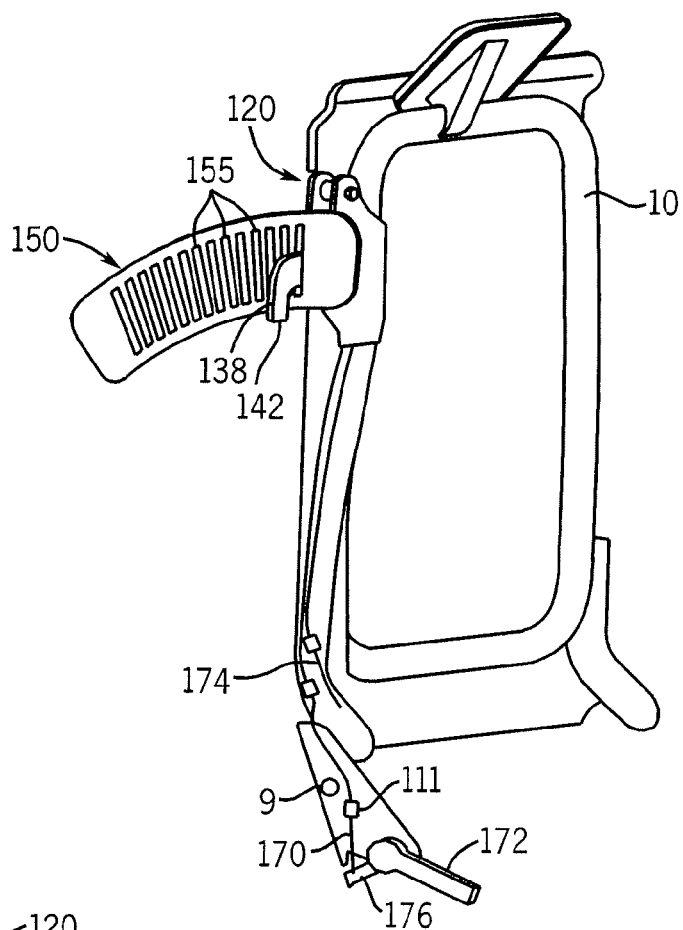
FIG. 19 is a partial perspective view of a seat back including a reclining seat high latch hook carriage and structural hook engaged with a striker assembly.
Figure 20:
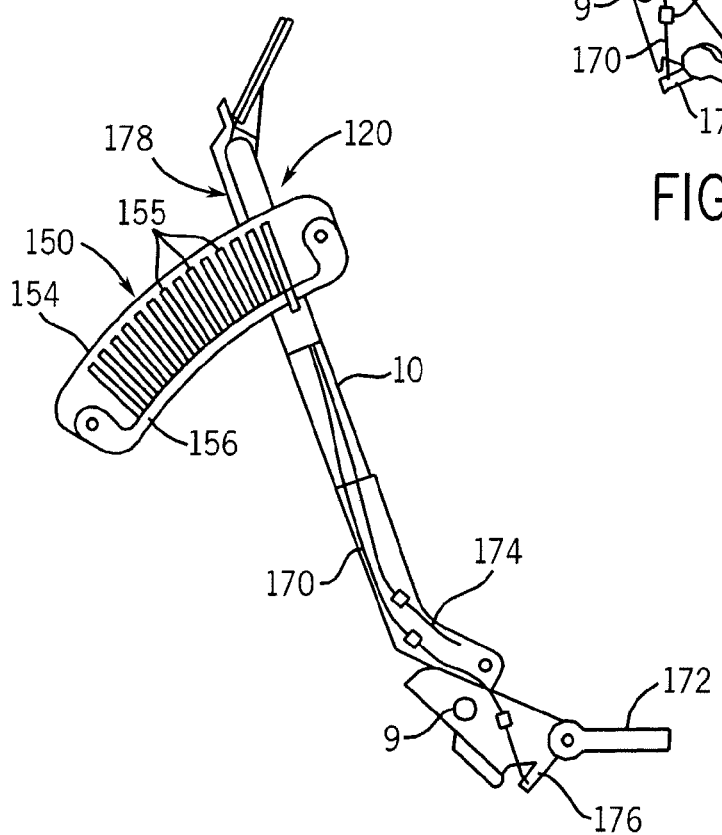
FIG. 20 is a side view of the seat and reclining high seat latch assembly illustrated in FIG. 19.

The reclining seat high latch assembly 120 is typically mounted to a frame work of the seat back 10 as illustrated in FIGS. 19 and 20 above the pivot point 9 of the seatback 10. The reclining seat high latch assembly 120 can be coupled to the seat back 10 by any convenient and conventional manner, for example, by bolts, rivets or welding. A cable 17 operatively coupled to a pulley 148 which is mounted on the hollow rivet 136 which supports the structural hook 138. The pulley can be used to articulate the structural hook 138. A first biasing member 140 is coupled to the structural hook 138 and biases the structural hook in its deployed position as illustrated in FIG. 21.

The pulley 148 is coupled to the structural hook 138. One end of the cable 170 is coupled to the pulley 148. The other end of the cable is coupled to a recline cable lever 176. The recline cable lever 176 is coupled to the recline lever 172 which is mounted on the seat pivot bracket 111. The seat pivot bracket 111 may be mounted on the vehicle 5 in any convenient and conventional manner. The seat pivot bracket 111 also supports the seat back pivot 9 which couples the seat back 10 to the seat base 8.

In operation, a user manipulates the recline handle 172, the cable 170 is pulled which in turn rotates the pulley 148 and moves the structural hook 138 from its deployed position to a retracted position as illustrated in FIG. 22. In the retracted position, the seat back 10 can be moved to one of several reclining positions 114 as provided by the wall rack assembly 150.

The wall rack assembly 150 includes a wall rack 154 which defines a plurality of slots 155. A wall rack reinforcement member 156 is coupled to the wall rack 154. The wall rack assembly 150 is mounted to the vehicle 5 behind the vehicle trim wall 152. A wall rack opening 158 is defined in the vehicle trim wall 152 (see FIGS. 25 and 26).

It should be understood that the seat 10 can be moved either manually or by an actuator. A biasing member coupled to the seat back 10 and the seat base 8 proximate the seat back pivot 9 can provide a counter-force to movement of the seat back 10 to one of the reclined positions 114. The actuator can be of any convenient and conventional device such as an electric motor, a hydraulic motor or a pneumatic motor, each with appropriate controls.

The seat 6 can also be provided with a dump cable 174. One end of the dump cable 174 is coupled to the structural hook 138 and the other end of the dump cable 174 is coupled to the seat pivot bracket 111. The dump cable 174 retracts the structural hook 138 into the reclining seat high latch assembly 120 as the seat back 10 is moved from the seating (design) position 112 to a fold-flat stowed position. The retraction of the structural hook 138 is effected by the relative motion between the point where the dump cable 174 is attached to the hook 138 and the fixed point on the seat pivot bracket 111. The movement of the seat back 10 to the folded down position tightens the dump cable 174 which acts to retract the hook 138. In the stowed position, the hook 138, which is biased to an open position, is prevented from extending out of the reclining seat high latch assembly 120. When the seat back 10 is returned from the stowed position to the seating (design) position 112, the dump cable 174 slackens. The slackening of the dump cable 174 allows the structural hook 38 to be moved to a deployed position subject to the action of a trip pawl 178. One embodiment provides that the cable 170 for facilitating the seat reclining action and the dump cable 174 for facilitating the retraction of the hook 138 be accomplished with a single cable appropriately attached to the seat assembly.

Figure 24:
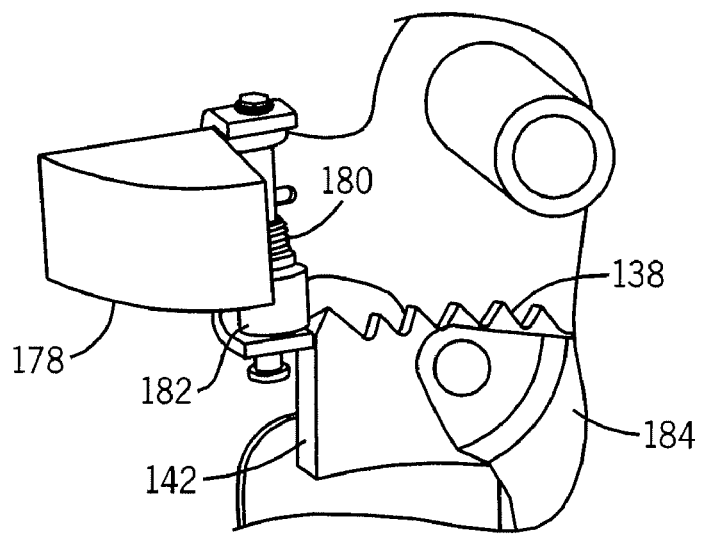
FIG. 24 is a detailed view of the trip pawl in contact with the leading edge of the structural hook, with the structural hook in the fold flat/recline position.

The trip pawl 178 is pivotably mounted on the reclining seat high latch assembly 120. Typically, it is mounted on the back support bracket 134 and biased by a third biasing member 180, as illustrated in FIG. 23. As illustrated in FIG. 24, the trip pawl 178 includes a pawl stop 182. The pawl stop 182 prevents the structural hook 138 from moving from its stored position to its deployed position by contacting the leading edge 142 of the structural hook 138. When the seat back 10 moves to a reclining position 114, the trip pawl 178 is moved by contacting the wall rack assembly 150. The action of the seat back 10 moving pushes the trip pawl 138 and pivots the trip pawl and its pawl stop 182 away from the leading edge 142 of the structural hook 138 which allows the structural hook 138 to move into one of the slots 155 in the wall rack assembly 150. The trip pawl can be formed from nylon or plastic of suitable strength and resilience.

Selection of the slot 155 in the wall rack assembly 150 is controlled by the user of the seat by manipulating the recline cable handle 172 or appropriate controls coupled to the cable 170 or the structural hook 138. It should be understood that the structural hook 138 can be coupled to an actuator such as an electric motor and appropriate controls to move the hook from its stored to a deployed position and vice versa.

Another embodiment of the reclining seat high latch assembly 120 includes a seatbelt retractor-lock-out lever 184. The seatbelt retractor-lock-out lever 184 is pivotably mounted in the reclining seat high latch assembly 120 typically on the back support bracket 134 and is configured to engage the structural hook 138. The seatbelt retractor-lock-out lever is coupled, by a lock-out cable 188 to the seatbelt mechanism (not shown). The seatbelt retractor, lock-out lever prevents the movement of the structural hook 138 if the seatbelt is not properly engaged. The seatbelt retractor lock-out lever 184 is biased by a fourth biasing member 186.

It should be understood that the reference to biasing members 140, 146, 180, and 186 can refer to torsion springs, clock springs, or the like to provide a biasing force to the member which it is coupled.

The reclining seat high latch assembly 120 can also be provided with an anti-chuck plate 144 as illustrated in FIGS. 21, 22 and 23. "Chucking" or "chuck" for purposes of this application means movement, fore-and-aft or side to side, of associated elements or apparatus members. For example, movement of the hook 138 within a slot 155 of the wall rack 154. Several embodiments of the anti-chuck plate 144 are illustrated and can include raised portions which frictionally impede movement of the structural hook 138, a hook ridge 143 configured on the structural hook 138 can also be provided to prevent chucking of the hook 138 while the hook 138 is in a slot 155 of the wall rack assembly 150. The anti-chuck plate 144 can be formed or stamped from metal such as, for example, steel. For example, the hook ridge, can be semi-pierced wedge which prevents fore and aft travel of the hook during normal operation. In the event of a vehicle crash, the seat is generally pulled at 60° off the forward x direction which enables the hook 138 to engage the wall rack assembly 150 and withstand a force of up to 22,000 N. The wall rack assembly 150 typically is coupled to the vehicle structure and therefore forces on the seat back 10 are transferred to the vehicle structure.

For aesthetic reasons, the wall rack assembly 150 includes a wall rack covering 160 and a bezel 162. (See FIGS. 25 and 26.) The wall rack covering 160 can be an endless strip of material that moves with the bezel 162 to a selected, predetermined position within the wall rack opening 158 and aligned with one of the slots 155 in the wall rack assembly 150. The wall rack covering 160 can be any thin flexible material, for example, stantoprene, which may be textured and colored to match the vehicle trim wall 152. The wall rack covering 160 travels along the wall rack 154 and when the structural hook 138 is engaged with the wall rack assembly 150, the hook 138 pushes against the back side of the wall rack covering 160 thereby creating a tension in the covering. (See FIG. 26.)

The several described elements of the reclining seat high latch assembly 120 can be composed of any suitable material with steel of appropriate composition as the most practical material.

Although the disclosed embodiments have been described in some detail, it should be understood that various changes, substitutions and alterations can be made to the embodiments without departing from their spirit and scope.

What is claimed is:

1. A high latch for a vehicle seat, with the vehicle seat having a seat back pivotally coupled to a seat base and the seat base coupled to a vehicle body having a vehicle wall, the high latch comprising:
   a hook carriage including a pivotable structural hook, with the hook carriage coupled to the seat back; and
   a wall rack which defines a plurality of slots,
   wherein the wall rack is configured to be mounted to the vehicle body,
   wherein the structural hook is configured to move from a first position in one of the plurality of slots to a second position in another of the plurality of slots,
   wherein the hook carriage comprises: a front support bracket; a back support bracket; and at least two fasteners coupled to the front and back support brackets to maintain the front and back support brackets in a spaced apart relationship,
   wherein the structural hook is pivotably mounted on one of the at least two fasteners.

2. The high latch of claim 1, including a cable operatively coupled to the structural hook and a cable actuator, wherein the cable acts upon the structural hook allowing the seat back to move.

3. The high latch of claim 2, including a first biasing member coupled to the structural hook to maintain the structural hook in a deployed position.

4. The high latch of claim 3, including a trip pawl pivotally coupled to the back support bracket, the trip pawl having a pawl stop and aligned to prevent the structural hook from moving from a stored position to the deployed position.

5. A vehicle seat coupled to a vehicle body having a vehicle wall, the vehicle seat comprising:
   a seat base coupled to the vehicle body;
   a seat back pivotally coupled to the seat base; and
   a high latch including a hook carriage having a pivotable structural hook, with the hook carriage coupled to the seat back and a wall rack assembly having a plurality of slots configured to selectively receive the structural hook,
   wherein the wall rack assembly is coupled to the vehicle body,
   wherein the structural hook is configured to be in a deployed position within one of the plurality of slots such that seat back is placed in a first position and to be in a stored position such that the seat back is placed in a second position.

6. The vehicle seat of claim 5, including an actuator coupled to the structural hook and configured to manipulate the structural hook from its deployed position to its stored position.

7. The vehicle seat of claim 6, wherein the actuator is one of a cable and an electric motor.

8. The vehicle seat of claim 5, wherein the first position of the seat back is one of a seating position and stowed position.

9. The vehicle seat of claim 8, wherein the second position of the seat back is the other of the seating position and the stowed position.

* * * * *